US 7,990,104 B2

(12) United States Patent
Chen et al.

(10) Patent No.: US 7,990,104 B2
(45) Date of Patent: Aug. 2, 2011

(54) MOBILE CHARGER RECEPTACLE CONFIGURED WITH UNIVERSAL SERIAL BUS (USB), CIGARETTE LIGHTER ADAPTER (CLA) PLUG AND CONTROL FIRMWARE

(75) Inventors: Jheng-Kuan Chen, Jia Yi (TW); Henry Chen, City of Industry, CA (US)

(73) Assignee: Ever Win International Corporation, City of Industry, CA (US)

( * ) Notice: Subject to any disclaimer, the term of this patent is extended or adjusted under 35 U.S.C. 154(b) by 744 days.

(21) Appl. No.: 12/057,606

(22) Filed: Mar. 28, 2008

(65) Prior Publication Data

US 2009/0243537 A1    Oct. 1, 2009

(51) Int. Cl.
*H01M 10/46* (2006.01)
(52) U.S. Cl. .......................................................... 320/111

(58) Field of Classification Search .................. 320/107, 320/111, 114, 115
See application file for complete search history.

(56) References Cited

U.S. PATENT DOCUMENTS

| | | | |
|---|---|---|---|
| 2004/0121645 A1* | 6/2004 | Postrel | 439/374 |
| 2006/0001920 A1* | 1/2006 | Moreno et al. | 358/498 |
| 2006/0005055 A1* | 1/2006 | Potega | 713/300 |

* cited by examiner

*Primary Examiner* — Edward Tso
(74) *Attorney, Agent, or Firm* — Rabin & Berdo, P.C.

(57) ABSTRACT

The present invention is a mobile charger receptacle configured with universal serial bus (USB), cigarette lighter adapter (CLA) plug, and control firmware, comprising a housing, a cigarette lighter adapter plug disposed on the one side of the housing, and a USB plug allocated on the other side of the housing. The USB plug and the CLA plug are electrically connected with a control firmware disposed inside the housing. The control firmware enables the present invention to charge any type of mobile phone.

3 Claims, 3 Drawing Sheets

MOBILE CHARGER RECEPTACLE CONFIGURED WITH UNIVERSAL SERIAL BUS (USB), CIGARETTE LIGHTER ADAPTER (CLA) PLUG AND CONTROL FIRMWARE

FIELD OF THE INVENTION

The present invention relates to a mobile charger, and more particularly, to a mobile charger receptacle configured with universal serial bus (USB), cigarette lighter adapter (CLA) plug, and control firmware for all varieties of mobile phones.

BACKGROUND OF THE INVENTION

The industrial technology flourished in $20^{th}$ century, especially the thriving achievement in communication field with the production of mobile phones. The mobile phone is a long-range, portable electronic device used for communication. In addition to the standard voice function of the mobile phone, the current mobile phone can support many additional services such as SMS for text messaging, email, access to Internet, MMS for sending and receiving photos and video, and playing games. Thus, the mobile phone provides convenience to the user.

The mobile phone generally utilizes and obtains power from a rechargeable battery. The mobile phone constantly consumes electricity whether in use or on standby. Once the battery is depleted of all electricity, a power source and a proper charging mechanism is required to recharge the mobile phone.

Each existing mobile phone manufacturers such as Nokia, Motorola, Sony Ericsson, Samsung and so on utilizes different specification/configuration of mobile charger. Moreover, to allow the mobile phone to be recharged conveniently, many mobile chargers are provided with a USB port and a cigarette lighter adapter. Thereby, the mobile phone can be recharged from a vehicle's cigarette lighter receptacle.

In general, a USB port is utilized to connect to a host equipment through a USB cable in conformity with the USB standards. The host equipment may supply power or exchange data communication through the USB port.

Although most mobile phone charger with USB port can successfully charge the mobile phone with the power from the host equipment, some manufactures like Motorola need an extra voltage booster to assist charging their mobile phones through USB port. Therefore, when a person has a mobile phone from Motorola and also mobile phones from other manufacturers, either the person has to buy a voltage booster or several different chargers, which will both increase the inconvenience and cost.

SUMMARY OF THE INVENTION

It is difficult to find a mobile charger with a cigarette lighter adapter device and a USB port that will charge all kinds of mobile phones from various manufacturers. Therefore, the primary objective of the present invention is to provide a mobile charger receptacle configured with USB, CLA plug, and control firmware. The mobile charger receptacle comprises a housing, a CLA plug disposed on the one side of the housing, and a USB plug allocated on the other side of the housing, wherein the USB plug and the CLA plug are electrically connected with a control firmware disposed inside the housing. The control firmware further includes a control application and a micro control unit (MCU). The control firmware executes the following steps:

Step 100, detect whether the USB port is connected to an electronic component and detect whether the electronic component is a data storage device.

Step 200, if the MCU detects the electronic component is a data storage device, the control application is configured to charge the battery from the power bus of USB to obtain power from the cigarette lighter adapter, i.e. operates as a self-powered USB peripheral device, Step 300, if the MCU detects the electronic component is not a data storage device, the USB connection will be inactive, the control application will address the USB connection active, and charge the battery from the power bus of USB, which obtains power from the cigarette lighter adapter device, and Step 400, repeat step 300 until the battery is fully charged.

The mobile charger of the present invention can be used to recharge any kinds of mobile phones from various manufacturers. With the mobile charger receptacle configured with USB, CLA plug, and control firmware of the present invention, an user simply use a standard USB cable connection to the USB plug and the mobile phone to charge the mobile phone with the cigarette lighter adapter. Therefore, the present invention not only saves money, but also gives the user the convenience of using one mobile charger without having to purchase a voltage booster.

BRIEF DESCRIPTIONS OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTIONS OF THE PREFERRED EMBODIMENT

Figure 1:
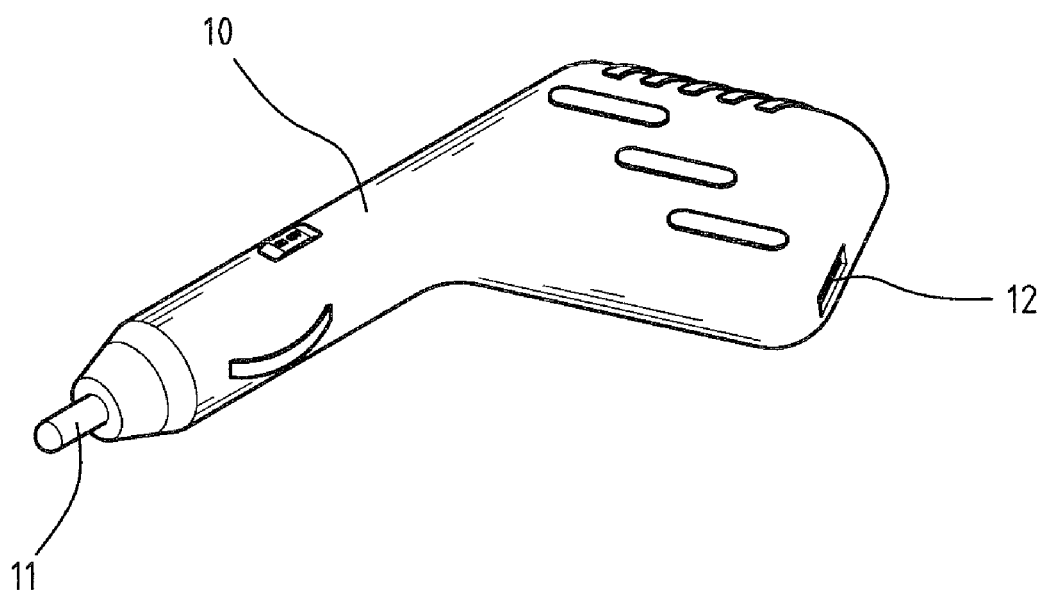
FIG. 1 illustrates a perspective view of the present invention.
Figure 2:
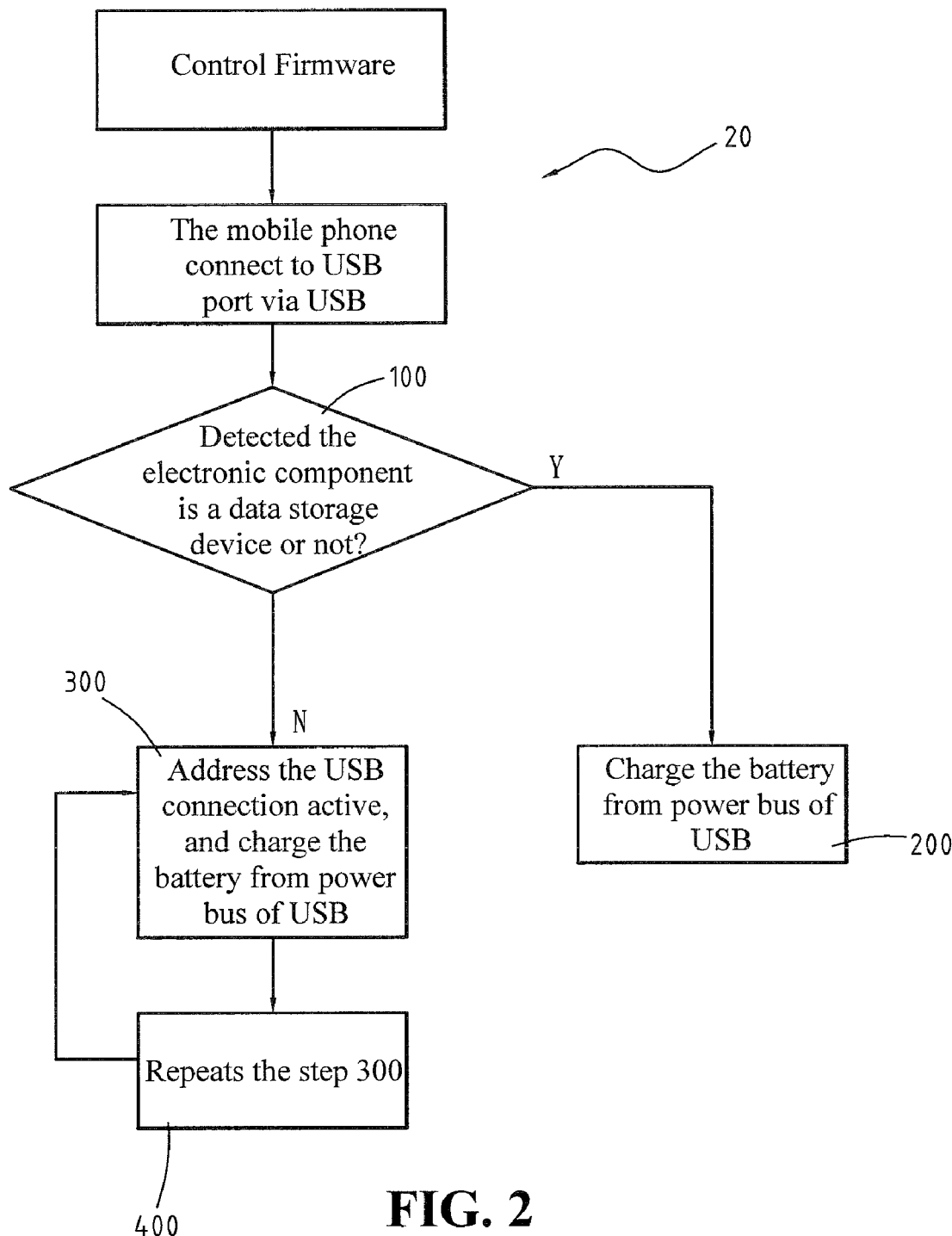
FIG. 2 is a flowchart illustrating the control application operation of the present invention.
Figure 3:
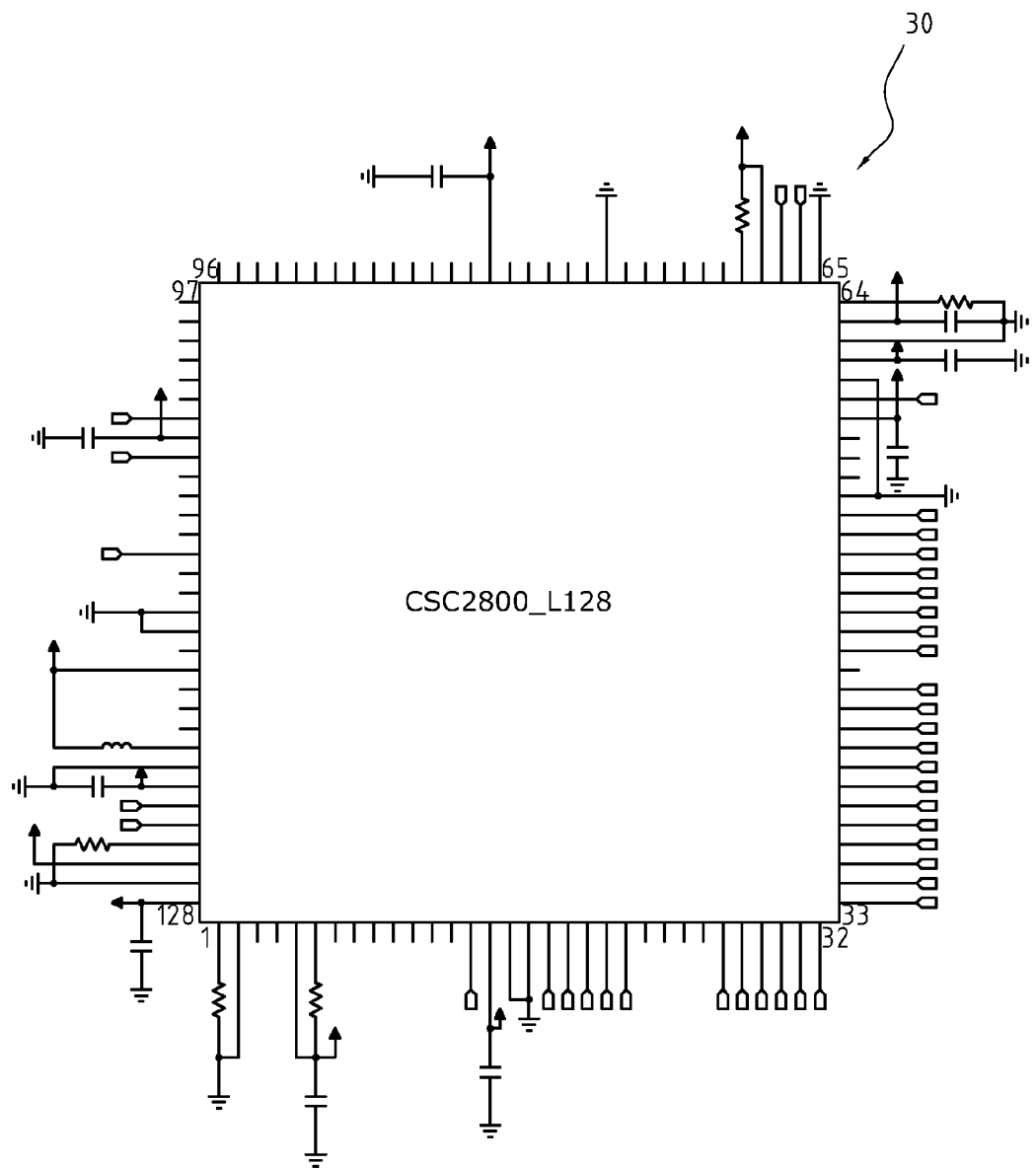
FIG. 3 is a circuit layout of the CSC2800_L128 micro control unit of the present invention.

FIG. 1 is a perspective view of the mobile charger of the present invention. FIG. 2 is a flowchart illustrating the flow control operation. FIG. 1 and FIG. 2 illustrate a mobile charger receptacle configured with USB, CLA plug, and control firmware of the present invention, comprising a housing (10), a CLA plug (11) disposed on the one side of the housing (10), and a USB plug (12) allocated on the other side of the housing (10). The USB plug (12) and the CLA plug (11) are electrically connected with a control firmware (20) disposed inside the housing (10), wherein the control firmware (20) further including a control application and a micro control unit (MCU) (30). FIG. 3 is a circuit layout of the MCU (30). The MCU (30) is a CSC2800 dual high-speed USB on-the-go (OTG) integrated controller with serial number CSC2800_LI28. The control firmware (20) executes the following steps:

Step 100, detect whether the USB port is connected to an electronic component and detect whether the electronic component is a data storage device.

Step 200, if the MCU detects the electronic component is a data storage device, the control application is configured to charge the battery from the power bus of USB to obtain power from the cigarette lighter adapter, i.e. operates as a self-powered USB peripheral device, Step 300, if the MCU detects the electronic component is not a data storage device, the USB connection will be inactive, the control application will address the USB connection active, and charge the battery from the power bus of USB, which obtains power from the cigarette lighter adapter device, and Step 400, repeat step 300 until the battery is fully charged.

Accordingly, the control application enables the charging of the battery in various types of mobile phone. Thus, the present invention eliminates the need for a voltage booster for particular mobile phone like Motorola and can be used for any type of mobile phones.

While the invention has been particularly shown and described with reference to the preferred embodiments thereof, these are, of course, merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. A mobile charger receptacle configured with a universal serial bus (USB), a cigarette lighter adapter (CLA) plug, and control firmware, comprising:
    a housing, a cigarette lighter plug disposed on one side of the housing, and a USB plug on another side of the housing, wherein the USB and the CLA plug are electrically connected with the control firmware disposed inside the housing, the control firmware including a control application and a micro control unit (MCU), the control firmware executing the following steps:
    Step (100), detecting whether the USB plug is connected to an electronic component and detecting whether the electronic component is a data storage device or not,
    Step (200), if the MCU determines the electronic component is a data storage device, the control application is configured to charge a device battery from the power bus of the USB to obtain power from the cigarette lighter adapter, namely, to operate as a self-powered USB peripheral device,
    Step (300), if the MCU determines that the electronic component is not a data storage device, the USB connection will be inactive, and the control application activates the USB connection, and charges the battery from the power bus of the USB, which obtains power from the cigarette lighter adapter, and
    Step (400), repeating step (300) until the battery is saturated to the electrical volume of the battery.

2. The mobile charger receptacle configured with a universal serial bus (USB), a cigarette lighter adapter (CLA) plug, and control firmware of claim 1, wherein the MCU is a dual high-speed USB on-the-go integrated controller.

3. The mobile charger receptacle configured with a universal serial bus (USB), a cigarette lighter adapter (CLA) plug, and control firmware of claim 1, wherein the USB is connected through a USB cable in conformity with the USB standard.

* * * * *